(12) United States Patent
Ichimoto et al.

(10) Patent No.: US 7,706,955 B2
(45) Date of Patent: Apr. 27, 2010

(54) VEHICLE AND VEHICLE CONTROL METHOD

(75) Inventors: Kazuhiro Ichimoto, Nisshin (JP); Shunsuke Oyama, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 28 days.

(21) Appl. No.: 12/226,352

(22) PCT Filed: May 16, 2007

(86) PCT No.: PCT/JP2007/060023

§ 371 (c)(1),
(2), (4) Date: Oct. 16, 2008

(87) PCT Pub. No.: WO2007/135908

PCT Pub. Date: Nov. 29, 2007

(65) Prior Publication Data

US 2009/0093940 A1 Apr. 9, 2009

(30) Foreign Application Priority Data

May 23, 2006 (JP) .............................. 2006-143318

(51) Int. Cl.
*F02D 13/02* (2006.01)
*F02D 45/00* (2006.01)
(52) U.S. Cl. ..................................... 701/102; 123/90.17
(58) Field of Classification Search ................. 701/102, 701/110, 114, 115; 123/350, 352, 90.15, 123/90.17

See application file for complete search history.

(56) References Cited

U.S. PATENT DOCUMENTS

| 5,187,935 | A | 2/1993 | Akiyama et al. |
| 5,329,894 | A * | 7/1994 | Phoenix et al. ........... 123/90.17 |
| 6,953,013 | B2 * | 10/2005 | Tani ......................... 123/90.17 |
| 7,146,944 | B2 * | 12/2006 | Tani et al. ................. 123/90.15 |
| 7,412,323 | B2 * | 8/2008 | Tanaka et al. ................ 701/104 |
| 2005/0028773 | A1 | 2/2005 | Komaki |

FOREIGN PATENT DOCUMENTS

JP A 02-173319 7/1990

(Continued)

*Primary Examiner*—Hieu T Vo
(74) *Attorney, Agent, or Firm*—Oliff & Berridge, PLC

(57) ABSTRACT

When a power demand Pe* is not less than a preset reference value Pref2 in a vehicle stop state (steps S110 and S260), a target rotation speed Ne* of an engine is set to a rotation speed of not lower than a relatively low minimum rotation speed Nemin2 (step S290). A target timing VT* is set according to the set target rotation speed Ne* to have a smaller degree of advance, compared with the setting of the target timing VT* in an engine operating state for driving the vehicle (step S300). The engine is accordingly driven at the target rotation speed Ne* with an open-close operation of an intake valve at the target timing VT*. Such drive control effectively reduces the driver's uncomfortable feeling or odd feeling triggered by operation of the engine at a relatively high rotation speed in the vehicle stop state. The drive control also ensures the better open-close timing of the intake valve according to the operating condition of the engine and enables more appropriate control of a variable valve timing mechanism configured to adjust the open-close timing of the intake valve.

17 Claims, 11 Drawing Sheets

FOREIGN PATENT DOCUMENTS

| | | | |
|---|---|---|---|
| JP | 4-109039 A * | 4/1992 |
| JP | A 2004-360672 | 12/2004 |
| JP | A 2005-061261 | 3/2005 |
| JP | A 2006-020481 | 1/2006 |
| JP | A 2006-090154 | 4/2006 |
| WO | WO 2006-028079 A1 | 3/2006 |

* cited by examiner

VEHICLE AND VEHICLE CONTROL METHOD

TECHNICAL FIELD

The present invention relates to a vehicle and a control method of the vehicle.

BACKGROUND ART

One proposed structure of a vehicle includes an engine having an open-close timing of an intake valve adjustable by a variable valve timing mechanism, a planetary gear mechanism connected with a crankshaft of the engine and with a driveshaft, a first motor configured to input and output power from and to the planetary gear mechanism, a second motor configured to input and output power from and to the driveshaft, and a battery configured to transmit electric power to and from the first motor and the second motor (see, Patent Document 1). The prior art vehicle of this proposed structure sets an engine operation curve based on elapse or non-elapse of a time period required for ensuring sufficient function of the variable valve timing mechanism since a start of the engine and drives the engine according to the preset engine operation curve. The engine is thus drivable even in the condition of insufficient function of the variable valve timing mechanism.

Patent Document 1: Japanese Patent Laid-Open No. 2004-360672

DISCLOSURE OF THE INVENTION

In the prior art vehicle of this structure, it is desired to prevent the driver from feeling uncomfortable or odd in the case of operation of the engine in the vehicle stop state. The variable valve timing mechanism may be structured to change the open-close timing of the intake valve by utilizing a supply of oil from an oil pump with rotation of the crankshaft of the engine. There may be an insufficient supply of oil from the oil pump required for changing the open-close timing of the intake valve, in some operating condition of the engine, especially in some condition of the rotation speed of the engine. It is accordingly desired to appropriately control the variable valve timing mechanism by taking into account the operating condition of the engine.

In the vehicle and the control method of the vehicle, there would thus be a demand for reducing the driver's uncomfortable feeling or odd feeling in the case of operation of an internal combustion engine in a vehicle stop state. In the vehicle and the control method of the vehicle, there would also be a demand for adequately controlling an open-close timing change mechanism to change an open-close timing of at least an intake valve and an exhaust valve of the internal combustion engine by utilizing a supply of an operating fluid with rotation of an output shaft of the internal combustion engine.

The present invention accomplishes at least part of the demand mentioned above and the other relevant demands by the following configurations applied to the vehicle and the control method of the vehicle.

According to one aspect, the invention is directed to a vehicle including: an internal combustion engine configured to output a power for driving the vehicle and to be drivable at any arbitrary drive point irrespective of a driving condition; an open-close timing change mechanism configured to change an open-close timing of either an intake valve or an exhaust valve of the internal combustion engine by utilizing a supply of an operating fluid with rotation of an output shaft of the internal combustion engine; and a controller configured, in an operation demand for driving to give an operation demand of the internal combustion engine for driving the vehicle, to control the open-close timing change mechanism and the internal combustion engine to drive the internal combustion engine at a rotation speed of not lower than a preset first rotation speed with an open-close operation of the intake valve or the exhaust valve of the internal combustion engine at an open-close timing corresponding to a first restriction, and in a vehicle stop-state operation demand to give an operation demand of the internal combustion engine in a vehicle stop state, to control the open-close timing change mechanism and the internal combustion engine to drive the internal combustion engine at a rotation speed of not lower than a preset second rotation speed, which is lower than the preset first rotation speed, with an open-close operation of the intake valve or the exhaust valve of the internal combustion engine at an open-close timing corresponding to a second restriction, which has a smaller degree of change from a reference timing than the first restriction.

In the operation demand for driving to give an operation demand of the internal combustion engine for driving the vehicle, the vehicle according to this aspect of the invention controls the open-close timing change mechanism and the internal combustion engine to drive the internal combustion engine at the rotation speed of not lower than the preset first rotation speed with an open-close operation of the intake valve or the exhaust valve of the internal combustion engine at the open-close timing corresponding to the first restriction. The open-close timing change mechanism changes the open-close timing of either the intake valve or the exhaust valve of the internal combustion engine by utilizing the supply of the operating fluid with rotation of the output shaft of the internal combustion engine. In the vehicle stop-state operation demand to give an operation demand of the internal combustion engine in the vehicle stop state, on the other hand, the vehicle of the invention controls the open-close timing change mechanism and the internal combustion engine to drive the internal combustion engine at the rotation speed of not lower than the preset second rotation speed, which is lower than the preset first rotation speed, with an open-close operation of the intake valve or the exhaust valve of the internal combustion engine at the open-close timing corresponding to the second restriction, which has the smaller degree of change from the reference timing than the first restriction. In the vehicle stop-state operation demand, the internal combustion engine is driven at the rotation speed of not lower than the relatively low second rotation speed. Such drive control effectively reduces the driver's uncomfortable feeling or odd feeling triggered by operation of the internal combustion engine at a high rotation speed, compared with the control of driving the internal combustion engine at a rotation speed of not lower than the first rotation speed whether in the operation demand for driving or in the vehicle stop-state operation demand. In the vehicle stop-state operation demand, the intake valve or the exhaust valve of the internal combustion engine is opened and closed at the open-close timing corresponding to the second restriction, which has the smaller degree of change from the reference timing. Compared with an open-close operation of the intake valve or the exhaust valve of the internal combustion engine at the open-close timing corresponding to the first restriction whether in the operation demand for driving or in the vehicle stop-state operation demand, such drive control ensures the better open-close timing of the intake valve or the exhaust valve of the internal combustion engine according to the operating condition of the internal combustion engine and the more appropriate control of the open-close timing change mechanism.

In one preferable application of the vehicle according to the above aspect of the invention, in the operation demand for driving, the controller performs the control with the first rotation speed set to a specific rotation speed of allowing a supply of the operating fluid required for changing the open-close timing of the intake valve or the exhaust valve of the internal combustion engine to the open-close timing change mechanism, and in the vehicle stop-state operation demand, the controller performs the control with the second rotation speed set to a specific rotation speed of not allowing the supply of the operating fluid required for changing the open-close timing of the intake valve or the exhaust valve of the internal combustion engine to the open-close timing change mechanism.

In another preferable application of the vehicle according to the above aspect of the invention, in the operation demand for driving, the controller performs the control with a restriction for ensuring efficient operation of the internal combustion engine set to the first restriction. This arrangement ensures efficient operation of the internal combustion engine in the operation demand for driving.

In one preferable structure of the vehicle of the invention, the open-close timing change mechanism changes the open-close timing of the intake valve and has a fixation-cancellation setter configured to fix the open-close timing of the intake valve at a predetermined first timing, which is a most delayed timing in an available range of the open-close timing of the intake valve, and to cancel the fixation of the open-close timing of the intake valve by utilizing the operating fluid, and the controller performs the control with the predetermined first timing set to the reference timing. In another preferable structure of the vehicle of the invention, the open-close timing change mechanism changes the open-close timing of the exhaust valve and has a fixation-cancellation setter configured to fix the open-close timing of the exhaust valve at a predetermined second timing, which is a most advanced timing in an available range of the open-close timing of the exhaust valve, and to cancel the fixation of the open-close timing of the exhaust valve by utilizing the operating fluid, and the controller performs the control with the predetermined second timing set to the reference timing. In still another preferable application of the vehicle according to the above aspect of the invention, the controller performs the control with the reference timing set to an open-close timing of the intake valve or the exhaust valve of the internal combustion engine without utilizing the operating fluid by the open-close timing change mechanism.

In one preferable embodiment of the invention, the vehicle further has an operation curve storage unit configured to store multiple operation curves including a first operation curve, which represents a relation of a drive point of the internal combustion engine with the first rotation speed set to a minimum rotation speed to power of the internal combustion engine, and a second operation curve, which represents a relation of a drive point of the internal combustion engine with the second rotation speed set to a minimum rotation speed to the power of the internal combustion engine. The controller sets the drive point of the internal combustion engine in the operation demand for driving according to the stored first operation curve and a power demand required for the internal combustion engine and controls the internal combustion engine to be driven at the set drive point, while setting the drive point of the internal combustion engine in the vehicle stop-state operation demand according to the stored second operation curve and a power demand required for the internal combustion engine and controlling the internal combustion engine to be driven at the set drive point. In the vehicle of this embodiment, the controller may perform the control with the second restriction set to a restriction of smoothly increasing a change degree from the reference timing with an increase in target rotation speed at the set drive point of the internal combustion engine. In the vehicle stop-state operation demand, the internal combustion engine is driven at the rotation speed of not lower than the relatively low second rotation speed. There may be an insufficient supply of the operating fluid required for changing the open-close timing of the intake valve or the exhaust valve to the open-close timing change mechanism, in some condition of the rotation speed of the internal combustion engine. Setting the second restriction to have a smooth increase in change degree from the reference timing with an increase in target rotation speed of the internal combustion engine effectively prevents an abrupt change of the open-close timing of the intake valve or the exhaust valve against a variation in target rotation speed of the internal combustion engine under the condition that the internal combustion engine is driven at a rotation speed equal to or slightly higher than the second rotation speed.

In another preferable embodiment of the invention, the vehicle further has: a power generator configured to enable power input and power output from and to the output shaft of the internal combustion engine; and an accumulator configured to transmit electric power to and from the power generator. The controller performs the control in response to a charge demand for the accumulator in the vehicle stop state as the vehicle stop-state operation demand. This arrangement desirably reduces the driver's uncomfortable feeling or odd feeling in the case of operation of the internal combustion engine based on a charge demand for the accumulator.

In one preferable application of the invention, the vehicle of this embodiment further has a motor configured to enable power input and power output from and to an axle of the vehicle. The power generator includes an electric power-mechanical power input output structure connected with the output shaft of the internal combustion engine and with the axle and configured to output at least part of power of the internal combustion engine to the axle through input and output of mechanical power and electric power. In the vehicle of this application, the electric power-mechanical power input output structure may include: a three shaft-type power input output assembly connected with three shafts, the output shaft of the internal combustion engine, a drive shaft linked with the axle, and a rotating shaft and designed to input and output power to a residual shaft based on powers input from and output to any two shafts among the three shafts; and a generator configured to input and output power from and to the rotating shaft.

According to another aspect, the invention is directed to a control method of the vehicle, where the vehicle has: an internal combustion engine configured to output a power for driving the vehicle and to be drivable at any arbitrary drive point irrespective of a driving condition; and an open-close timing change mechanism configured to change an open-close timing of either an intake valve or an exhaust valve of the internal combustion engine by utilizing a supply of an operating fluid with rotation of an output shaft of the internal combustion engine. In an operation demand for driving to give an operation demand of the internal combustion engine for driving the vehicle, the control method controls the open-close timing change mechanism and the internal combustion engine to drive the internal combustion engine at a rotation speed of not lower than a preset first rotation speed with an open-close operation of the intake valve or the exhaust valve of the internal combustion engine at an open-close timing corresponding to a first restriction. In a vehicle stop-state operation demand to give an operation demand of the internal combustion engine in a vehicle stop state, the control method controls the open-close timing change mechanism and the internal combustion engine to drive the internal combustion engine at a rotation speed of not lower than a preset second rotation speed, which is lower than the preset first rotation speed, with an open-close operation of the intake valve or the exhaust valve of the internal combustion engine at an open-close timing corresponding to a second restriction, which has a smaller degree of change from a reference timing than the first restriction.

In the operation demand for driving to give an operation demand of the internal combustion engine for driving the vehicle, the control method of the vehicle according to this aspect of the invention controls the open-close timing change mechanism and the internal combustion engine to drive the internal combustion engine at the rotation speed of not lower than the preset first rotation speed with an open-close operation of the intake valve or the exhaust valve of the internal combustion engine at the open-close timing corresponding to the first restriction. The open-close timing change mechanism changes the open-close timing of either the intake valve or the exhaust valve of the internal combustion engine by utilizing the supply of the operating fluid with rotation of the output shaft of the internal combustion engine. In the vehicle stop-state operation demand to give an operation demand of the internal combustion engine in the vehicle stop state, on the other hand, the vehicle of the invention controls the open-close timing change mechanism and the internal combustion engine to drive the internal combustion engine at the rotation speed of not lower than the preset second rotation speed, which is lower than the preset first rotation speed, with an open-close operation of the intake valve or the exhaust valve of the internal combustion engine at the open-close timing corresponding to the second restriction, which has the smaller degree of change from the reference timing than the first restriction. In the vehicle stop-state operation demand, the internal combustion engine is driven at the rotation speed of not lower than the relatively low second rotation speed. Such drive control effectively reduces the driver's uncomfortable feeling or odd feeling triggered by operation of the internal combustion engine at a high rotation speed, compared with the control of driving the internal combustion engine at a rotation speed of not lower than the first rotation speed whether in the operation demand for driving or in the vehicle stop-state operation demand. In the vehicle stop-state operation demand, the intake valve or the exhaust valve of the internal combustion engine is opened and closed at the open-close timing corresponding to the second restriction, which has the smaller degree of change from the reference timing. Compared with an open-close operation of the intake valve or the exhaust valve of the internal combustion engine at the open-close timing corresponding to the first restriction whether in the operation demand for driving or in the vehicle stop-state operation demand, such drive control ensures the better open-close timing of the intake valve or the exhaust valve of the internal combustion engine according to the operating condition of the internal combustion engine and the more appropriate control of the open-close timing change mechanism.

In one preferable application of the control method of the vehicle according to the above aspect of the invention, in the operation demand for driving, the control method performs the control with the first rotation speed set to a specific rotation speed of allowing a supply of the operating fluid required for changing the open-close timing of the intake valve or the exhaust valve of the internal combustion engine to the open-close timing change mechanism. In the vehicle stop-state operation demand, the control method performs the control with the second rotation speed set to a specific rotation speed of not allowing the supply of the operating fluid required for changing the open-close timing of the intake valve or the exhaust valve of the internal combustion engine to the open-close timing change mechanism.

In another preferable application of the control method of the vehicle of the invention, the open-close timing change mechanism changes the open-close timing of the intake valve and has a fixation-cancellation setter configured to fix the open-close timing of the intake valve at a predetermined first timing, which is a most delayed timing in an available range of the open-close timing of the intake valve, and to cancel the fixation of the open-close timing of the intake valve by utilizing the operating fluid, and the control method performs the control with the predetermined first timing set to the reference timing. In still another preferable application of the control method of the vehicle of the invention, the open-close timing change mechanism changes the open-close timing of the exhaust valve and has a fixation-cancellation setter configured to fix the open-close timing of the exhaust valve at a predetermined second timing, which is a most advanced timing in an available range of the open-close timing of the exhaust valve, and to cancel the fixation of the open-close timing of the exhaust valve by utilizing the operating fluid, the control method performs the control with the predetermined second timing set to the reference timing. In still another preferable application of the control method of the vehicle according to the above aspect of the invention, the control method performs the control with the reference timing set to an open-close timing of the intake valve or the exhaust valve of the internal combustion engine without utilizing the operating fluid by the open-close timing change mechanism.

In one preferable embodiment of the control method of the vehicle of the invention, the control method stores multiple operation curves including a first operation curve, which represents a relation of a drive point of the internal combustion engine with the first rotation speed set to a minimum rotation speed to power of the internal combustion engine, and a second operation curve, which represents a relation of a drive point of the internal combustion engine with the second rotation speed set to a minimum rotation speed to the power of the internal combustion engine. The control method sets the drive point of the internal combustion engine in the operation demand for driving according to the stored first operation curve and a power demand required for the internal combustion engine and controlling the internal combustion engine to be driven at the set drive point, while setting the drive point of the internal combustion engine in the vehicle stop-state operation demand according to the stored second operation curve and a power demand required for the internal combustion engine and controlling the internal combustion engine to be driven at the set drive point. In the control method of the vehicle of this embodiment, the control method may perform the control with the second restriction set to a restriction of smoothly increasing a change degree from the reference timing with an increase in target rotation speed at the set drive point of the internal combustion engine. In the vehicle stop-state operation demand, the internal combustion engine is driven at the rotation speed of not lower than the relatively low second rotation speed. There may be an insufficient supply of the operating fluid required for changing the open-close timing of the intake valve or the exhaust valve to the open-close timing change mechanism, in some condition of the rotation speed of the internal combustion engine. Setting the second restriction to have a smooth increase in change degree from the reference timing with an increase in target rotation speed of the internal combustion engine effectively prevents an abrupt change of the open-close timing of the intake valve or the exhaust valve against a variation in target rotation speed of the internal combustion engine under the condition that the internal combustion engine is driven at a rotation speed equal to or slightly higher than the second rotation speed.

BEST MODES OF CARRYING OUT THE INVENTION

Figure 1:
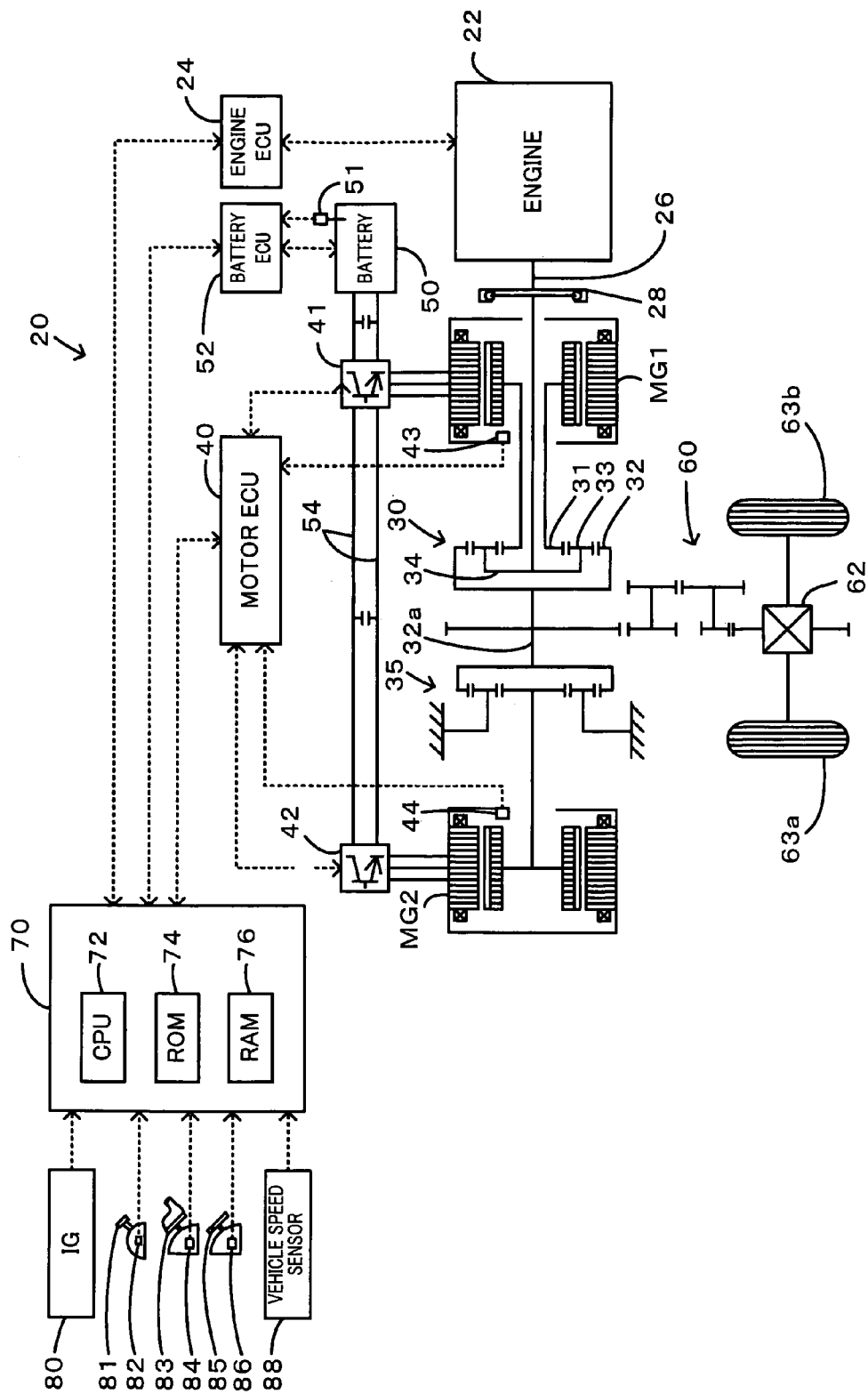
FIG. 1 schematically illustrates the configuration of a hybrid vehicle 20 in one embodiment of the invention.

One mode of carrying out the invention is described below as a preferred embodiment with reference to the accompanied drawings. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 connected to a crankshaft 26 or an output shaft of the engine 22 via a damper 28, a motor MG1 connected with the power distribution integration mechanism 30, and configured to enable power generation, a reduction gear 35 attached to a ring gear shaft 32a as a driveshaft linked with the power distribution integration mechanism 30, a motor MG2 connected with the reduction gear 35, and a hybrid electronic control unit 70 configured to control the operations of the whole power output apparatus.

Figure 2:
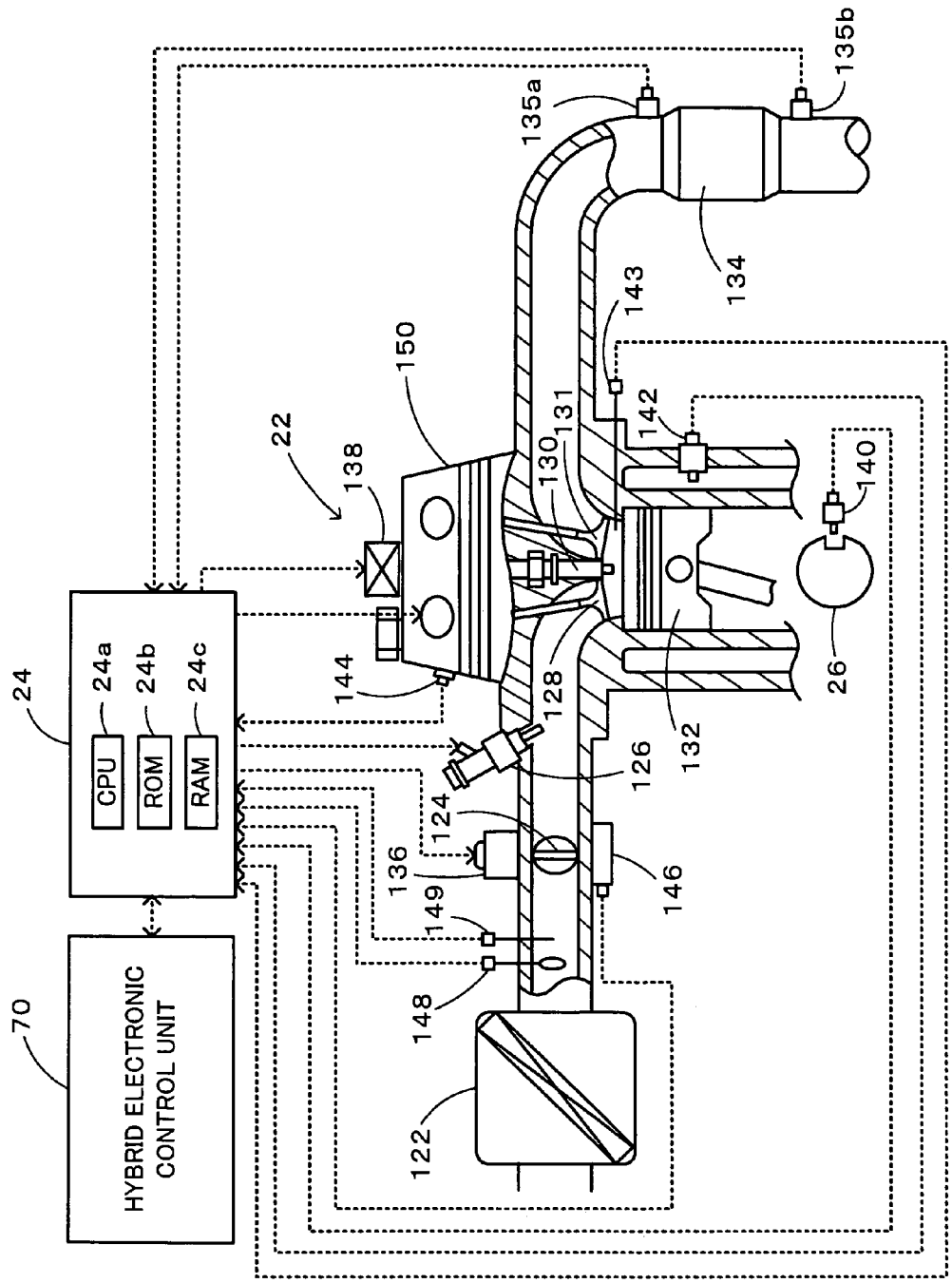
FIG. 2 shows the schematic structure of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

Figure 3:
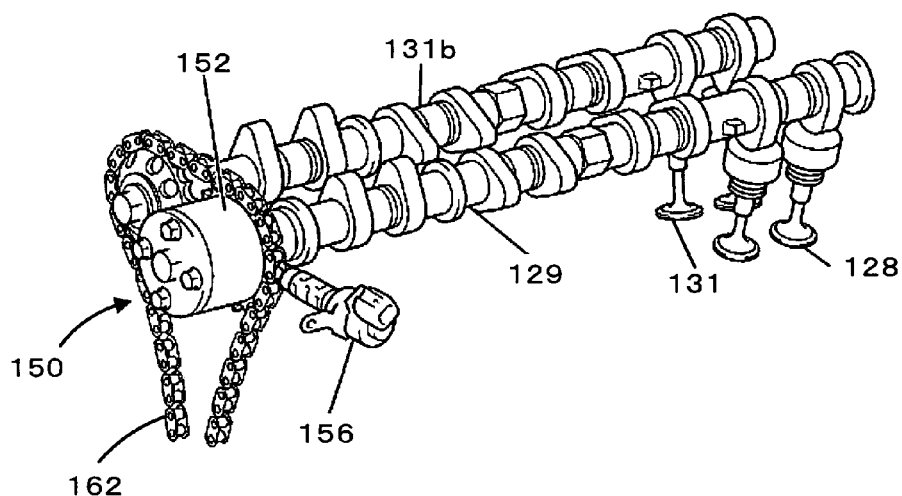
FIG. 3 shows the appearance of a variable valve timing mechanism 150.
Figure 4:
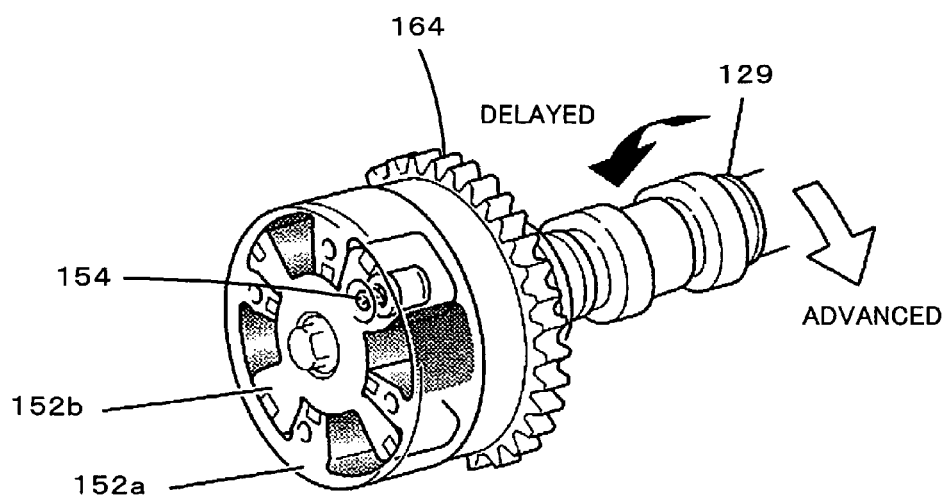
FIG. 4 shows the schematic structure of the variable valve timing mechanism 150.
Figure 5:
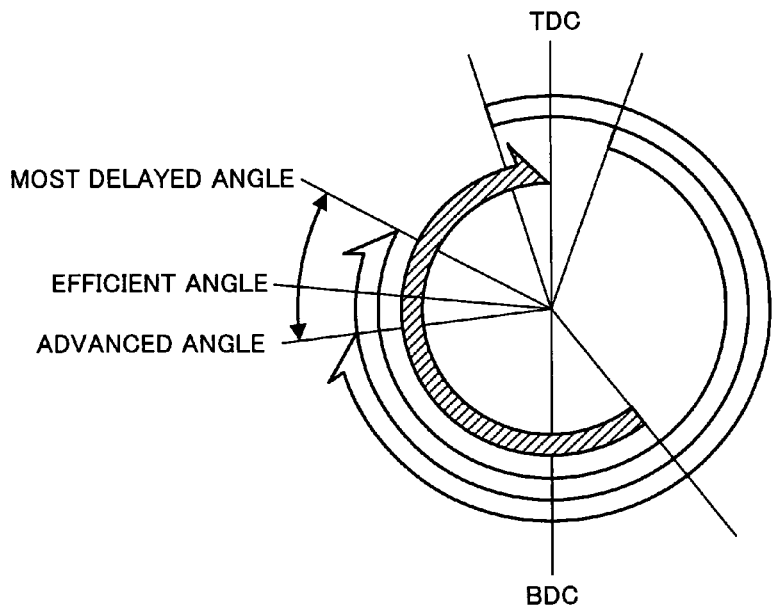
FIG. 5 shows the open-close timing of an intake valve 128 at an advanced angle of an intake camshaft 129 and the open-close timing of the intake valve 128 at a delayed angle of the intake camshaft 129.

The engine 22 also has a variable valve timing mechanism 150 constructed to sequentially vary an open-close timing of the intake valve 128. FIGS. 3 and 4 show the schematic structure of the variable valve timing mechanism 150. As illustrated, the variable valve timing mechanism 150 includes a vane-type VVT controller 152 and an oil control valve 156. The vane-type VVT controller 152 has a housing element 152a fastened to a timing gear 164 connected with the crankshaft 26 via a timing chain 162, and a vane element 152b fastened to an intake camshaft 129 arranged to open and close the intake valve 128. The oil control valve 156 utilizes a supply of oil from a non-illustrated oil pump, which is designed to pressure feed the oil flow by taking advantage of the rotation of the crankshaft 26, to apply a hydraulic pressure to an advance chamber and a delay chamber of the VVT controller 152. Regulation of the hydraulic pressure applied to the advance chamber and the delay chamber of the VVT controller 152 via the oil control valve 156 rotates the vane element 152b relative to the housing element 152a to sequentially vary the angle of the intake camshaft 129 at the open-close timing of the intake valve 128. FIG. 5 shows the open-close timing of the intake valve 128 at an advanced angle of the intake camshaft 129 and the open-close timing of the intake valve 128 at a delayed angle of the intake camshaft 129. In the description below, an efficient angle represents the angle of the intake camshaft 129 at the open-close timing of the intake valve 128 of enabling efficient power output from the engine 22. Advancing the angle of the intake camshaft 129 from the efficient angle causes the engine 22 to be driven in an operation state of enabling output of a high torque. Delaying the angle of the intake camshaft 129 to its most delayed angle (hereafter this angle is referred to as the 'reference angle') decreases a pressure variation in the cylinders of the engine 22 and causes the engine 22 to be driven in an operation state suitable for a stop and a start of the engine 22. In the description hereafter, a predetermined timing (reference timing) VT1 represents the open-close timing of the intake valve 128 corresponding to the most delayed angle (reference angle) of the intake camshaft 129. A predetermined timing VT2 represents the open-close timing of the intake valve 128 corresponding to the efficient angle of the intake camshaft 129.

Figure 6:
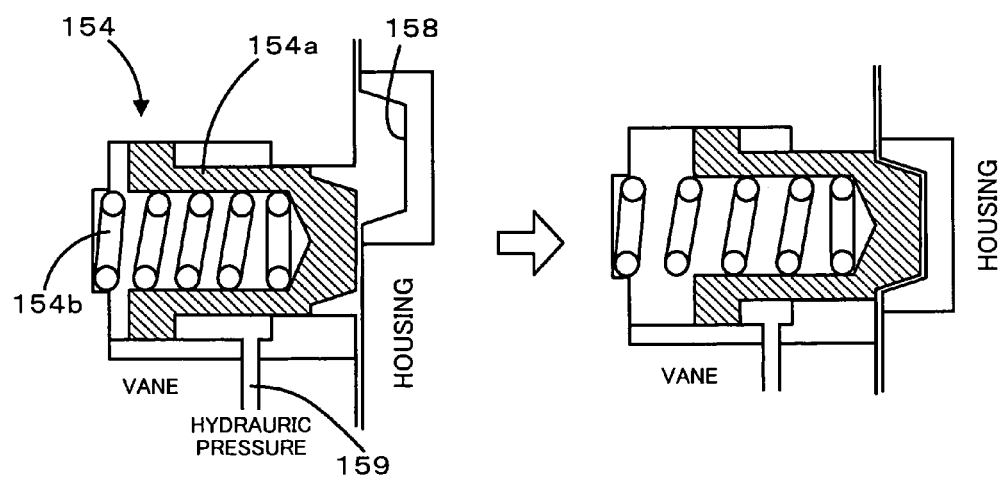
FIG. 6 shows the schematic structure of a lock pin 154.

A lock pin 154 is set on the vane element 152b of the VVT controller 152 to fix the relative rotation of the vane element 152b to the housing element 152a. The schematic structure of the lock pin 154 is shown in FIG. 6. As illustrated, the lock pin 154 has a lock pin body 154a and a spring 154b arranged to press the lock pin body 154a toward the housing element 152a. At the most delayed angle of the intake camshaft 129, the lock pin body 154a of the lock pin 154 is fit in a groove 158 formed in the housing element 152a by the pressing force of the spring 154b, so that the vane element 152b is fastened to the housing element 152a. A non-illustrated hydraulic actuator is provided to utilize a supply of oil from a non-illustrated oil pump and apply a hydraulic pressure exceeding the pressing force of the spring 154b via an oil path 159. The applied hydraulic pressure enables the lock pin body 154a of the lock pin 154 to be pulled out of the groove 158.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of an exhaust camshaft 131b driven to open and close an intake camshaft 129 of the intake valve 128 and an exhaust valve 131 for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, an intake air temperature from a temperature sensor 149 attached to the air intake conduit, an air-fuel ratio from an air fuel ratio sensor 135a, and an oxygen signal from an oxygen sensor 135b. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 configured to store processing programs, a RAM 76 configured to temporarily store data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Acc or the driver's depression amount of the accelerator pedal 83 from an accelerator pedal position sensor 84, a brake pedal position BP or the driver's depression amount of the brake pedal 85 from a brake pedal position sensor 86, and a vehicle speed V from a vehicle speed sensor 88. As explained above, the hybrid electronic control unit 70 is connected with the engine ECU 24, the motor ECU 40, and the battery ECU 52 via the communication port to transmit various control signals and data to and from the engine ECU 24, the motor ECU 40, and the battery ECU 52. At least a parking position (P position), a neutral position (N position), a drive position (D position), and a reverse position (R position) are detectable as the gearshift position SP of the gearshift lever 81 by the gearshift position sensor 82.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 7:
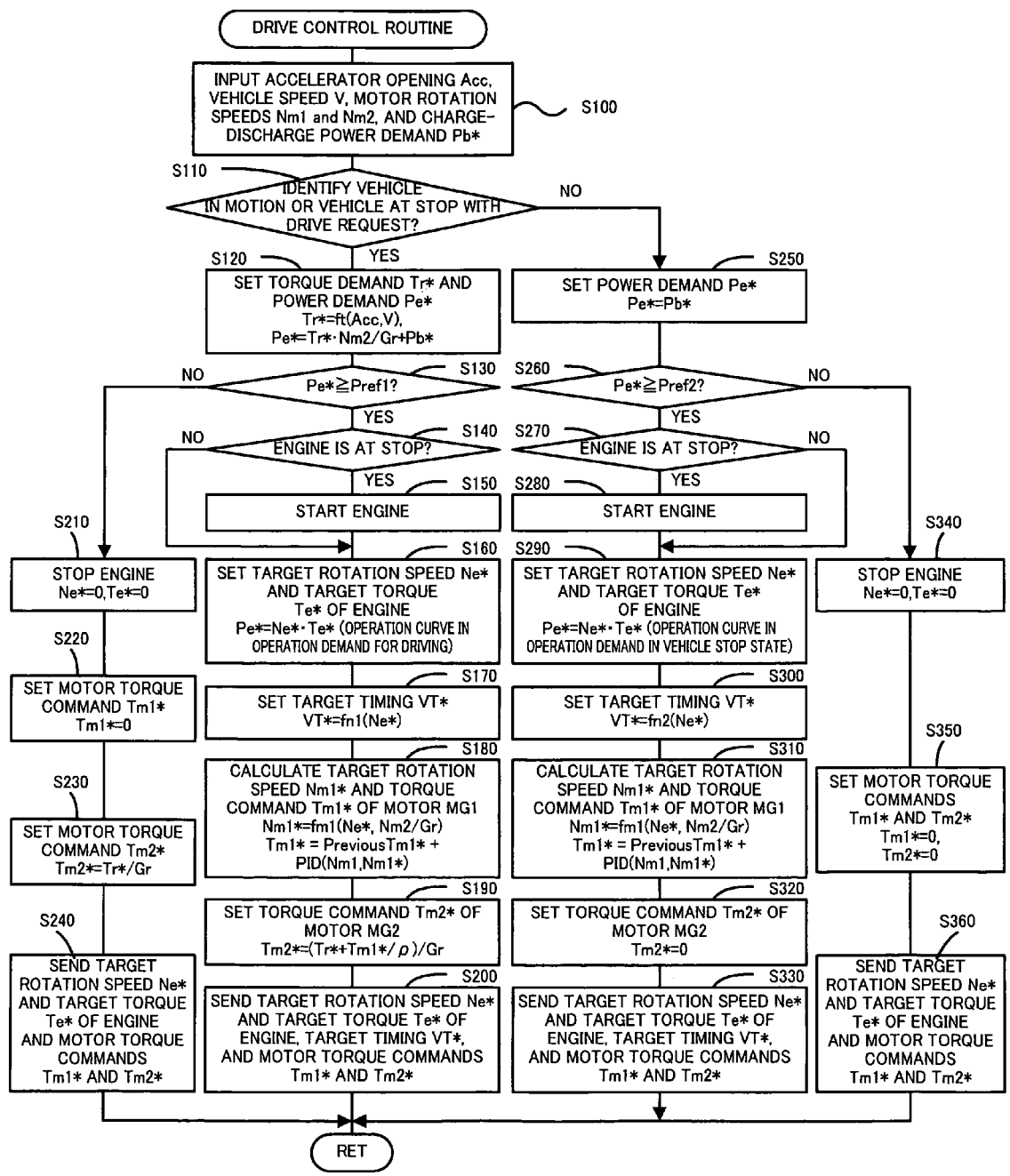
FIG. 7 is a flowchart showing a drive control routine executed by a hybrid electronic control unit 70.

The description regards the operations of the hybrid vehicle 20 of the embodiment having the configuration described above. FIG. 7 is a flowchart showing a drive control routine executed by the hybrid electronic control unit 70. This drive control routine is performed repeatedly at preset time intervals (for example, at every several msec).

At the start of the drive control routine, the CPU 72 of the hybrid electronic control unit 70 inputs various data required for control, for example, the accelerator opening Acc from the accelerator pedal position sensor 84, the vehicle speed V from the vehicle speed sensor 88, rotation speeds Nm1 and Nm2 of the motors MG1 and MG2, and a charge-discharge power demand Pb* to be charged into or discharged from the battery 50 (step S100). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The charge-discharge power demand Pb* is set according to the state of charge (SOC) of the battery 50 and is input from the battery ECU 52 by communication.

Figure 8:
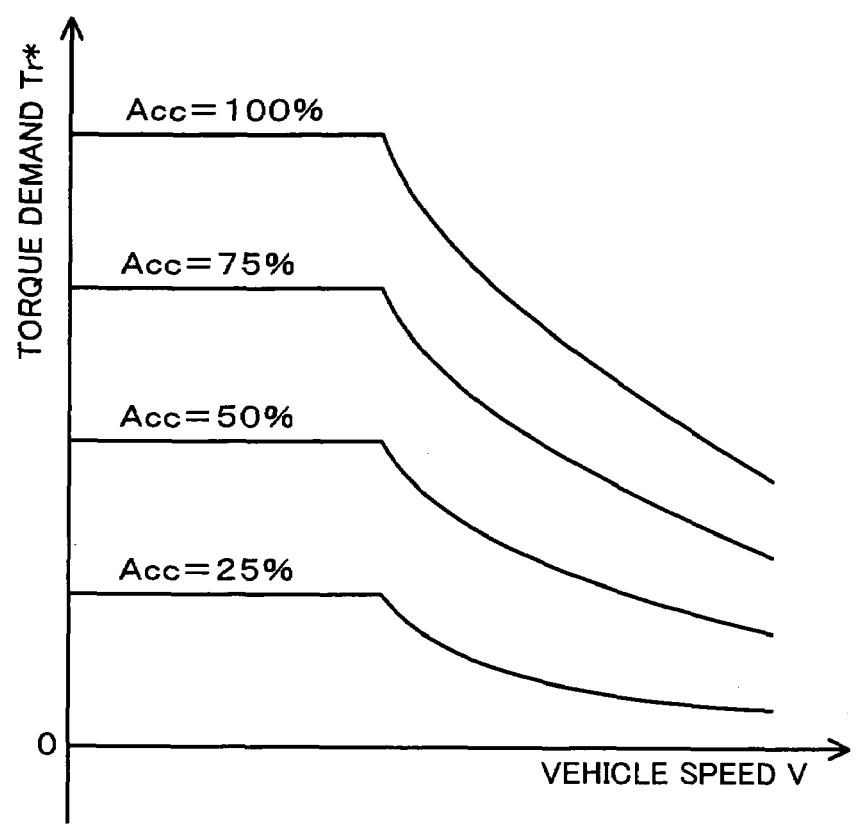
FIG. 8 shows one example of a torque demand setting map.

The CPU 72 subsequently identifies the status of the vehicle as either in motion or at stop with a drive request (step S110). The identification is based on the accelerator opening Acc, the brake pedal position BP, and the vehicle speed V. The procedure of the embodiment identifies the presence of a drive request when a restart of the stopped vehicle is expected, for example, in response to the driver's release of the brake pedal 85 at the drive position of the gearshift lever 81 subsequent to the driver's depression of the brake pedal 85 to stop the vehicle. Upon identification of either the vehicle in motion or the vehicle at stop with a drive request, the CPU 72 sets a torque demand Tr* to be output to the ring gear shaft 32*a* or the driveshaft linked with the drive wheels 63*a* and 63*b* as a torque required for the vehicle and a power demand Pe* required for the vehicle, based on the input accelerator opening Acc and the input vehicle speed V (step S120). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 8. The power demand Pe* is obtained as the sum of the product of the set torque demand Tr* and a rotation speed Nr of the ring gear shaft 32*a* and the charge-discharge power demand Pb* to be charged into or discharged from the battery 50. The rotation speed Nr of the ring gear shaft 32*a* may be given by multiplying the vehicle speed V by a conversion factor k or by diving the rotation speed Nm2 of the motor MG2 by a gear ratio Gr of the reduction gear 35. The procedure of the embodiment does not take into account a potential loss in setting the power demand Pe*, although the potential loss may be considered.

Figure 9:
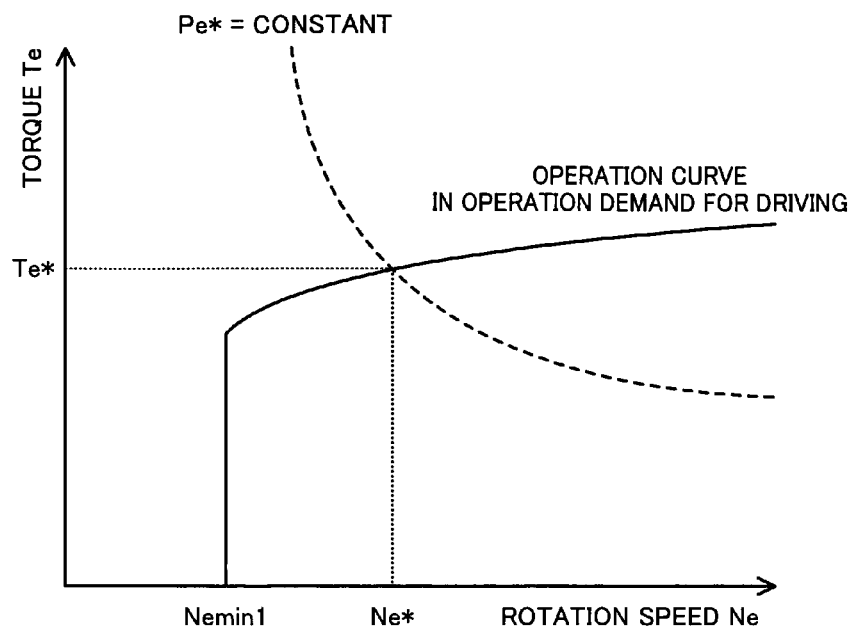
FIG. 9 shows a process of setting a target rotation speed Ne* and a target torque Te* with referring to an operation curve of the engine 22 in operation demand for driving.
Figure 10:
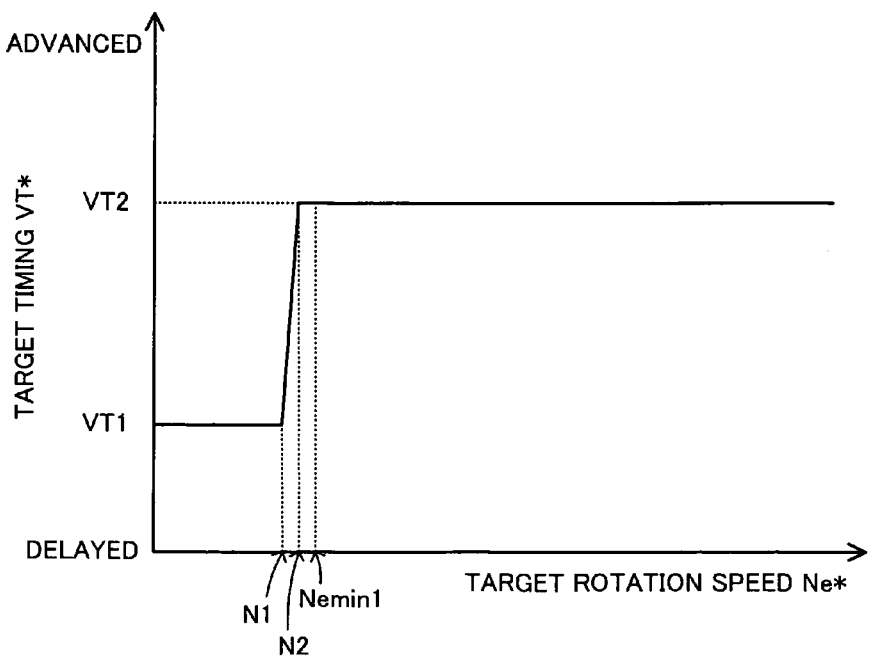
FIG. 10 shows one example of a target timing setting map in operation demand for driving.

The power demand Pe* is compared with a preset reference value Pref1 (step S130). The reference value Pref1 may be set to, for example, a lower limit value of a power range enabling efficient operation of the engine 22. The comparison between the power demand Pe* and the reference value Pref1 at step S130 determines whether there is an operation demand of the engine 22. The power demand Pe* of not less than the reference value Pref1 suggests an operation demand of the engine 22. In the operation stop condition of the engine 22, the motor MG1 is controlled to motor and start the engine 22 (steps S140 and S150). The CPU 72 subsequently sets a target rotation speed Ne* and a target torque Te* of the engine 22 according to the power demand Pe* (step S160) and sets a target timing VT* of the intake valve 128 based on the set target rotation speed Ne* (step S170). The target rotation speed Ne* and the target torque Te* of the engine 22 are set according to an efficient operation curve of ensuring efficient operation of the engine 22 and a constant power demand Pe* curve. FIG. 9 shows a process of setting the target rotation speed Ne* and the target torque Te* with referring to an operation curve of the engine 22 in operation demand of the engine 22 for driving (hereafter referred to as 'in operation demand for driving'). As illustrated, the operation curve of the engine 22 in operation demand for driving is set in a range of the rotation speed Ne that is not lower than a minimum rotation speed Nemin1. The target rotation speed Ne* and the target torque Te* are specified as an intersection of this operation curve and a constant power demand Pe* curve (=Ne*× Te*). The minimum rotation speed Nemin1 is determined according to the properties and the characteristics of the engine 22 and may be set equal to, for example, 1000 rpm or 1100 rpm. A concrete procedure of setting the target timing VT* in this embodiment provides and stores in advance a variation in target timing VT* against the target rotation speed Ne* of the engine 22 as a target timing setting map in operation demand for driving and reads the target timing VT* corresponding to the given target rotation speed Ne* from the map. One example of the target timing setting map in operation demand for driving is shown in FIG. 10. In the illustrated example of FIG. 10, the target timing VT* in operation demand for driving is set to a predetermined timing (reference timing) VT1 in a range of the target rotation speed Ne* of the engine 22 of lower than a preset rotation speed N1, which is lower than the minimum rotation speed Nemin1. The target timing VT* in operation demand for driving is set to a predetermined timing VT2, which is more advanced than the reference timing VT1, in a range of the target rotation speed Ne* of the engine 22 of not lower than a preset rotation speed N2, which is between the preset rotation speed N1 and the minimum rotation speed Nemin1. In a range of the target rotation speed Ne* of the engine 22 of not lower than the preset rotation speed N1 but lower than the preset rotation speed N2, the target timing VT* in operation demand for driving is rather abruptly varied to be advanced from the predetermined timing VT1 to the predetermined timing VT2 with an increase in target rotation speed Ne*. As explained above, the predetermined timing VT1 represents the open-close timing of the intake valve 128 corresponding to the most delayed angle (reference angle) of the intake camshaft 129. The predetermined timing VT2 represents the open-close timing of the intake valve 128 corresponding to the efficient angle of the intake camshaft 129. Here it is assumed that the engine 22 is started for driving. In the structure of the embodiment, the open-close timing of the intake valve 128 is set to the most delayed angle at the stop of the operation of the engine 22. The lock pin 154 fixes the angle of the intake camshaft 129 to the most delayed angle (reference angle). This means that the open-close timing of the intake valve 128 is fixed to the predetermined timing (reference timing) VT1. At a subsequent start of the engine 22 to be driven at a relatively low rotation speed, the open-close timing of the intake valve 128 may not be changed from the predetermined timing VT1, due to the failed supply of oil required for pulling the lock pin body 154a out of the groove 158 via the oil path 159. In this embodiment, the rotation speed N1 is set to a value approximate to an upper limit value of a specific rotation speed range of the engine 22 that does not allow the open-close timing of the intake valve 128 to be changed from the predetermined timing VT1, and may be set equal to, for example, 800 rpm or 850 rpm. The rotation speed N2 is set to a value approximate to a lower limit value of a specific rotation speed range of the engine 22 that enables the lock pin body 154a to be pulled out of the groove 158 and ensures a sufficient oil supply to the advance chamber of the VVT controller 152 via the oil control valve 156. Namely the rotation speed N2 is set to a value approximate to a lower limit value of a specific rotation speed range of the engine 22 that allows the open-close timing of the intake valve 128 to be sufficiently changed from the predetermined timing VT1, and may be set equal to, for example, 900 rpm or 950 rpm. In operation demand for driving, a rotation speed of not lower than the minimum rotation speed Nemin1 is set to the target rotation speed Ne* of the engine 22, so that the predetermined timing VT2 is set to the target timing VT*.

Figure 11:
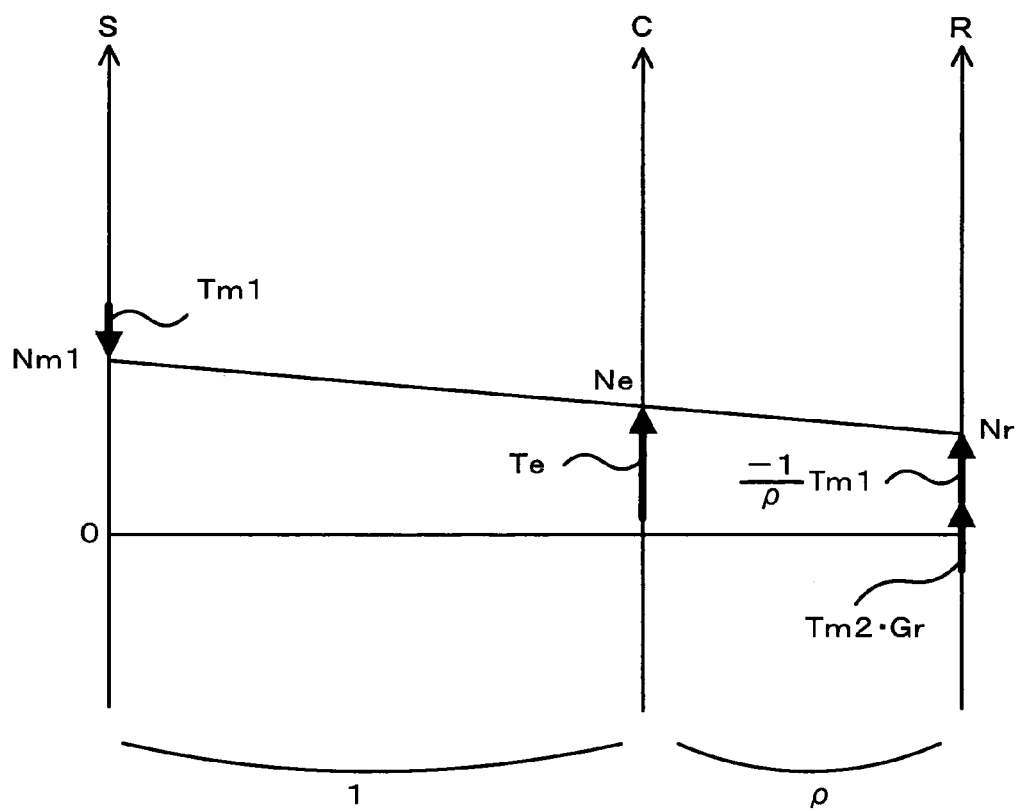
FIG. 11 is an alignment chart showing torque-rotation speed dynamics of respective rotational elements included in a power distribution integration mechanism 30.

The CPU 72 calculates a target rotation speed Nm1* of the motor MG1 from the set target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S180). The CPU 72 then calculates a torque command Tm2* of the motor MG2 from the torque demand Tr*, the torque command Tm1* of the motor MG1, the gear ratio ρ of the power distribution integration mechanism 30, and the gear ratio Gr of the reduction gear 35 according to Equation (3) given below (step S190). Equation (1) is a dynamic relational expression of the rotational elements included in the power distribution integration mechanism 30. FIG. 11 is an alignment chart showing torque-rotation speed dynamics of the respective rotational elements included in the power distribution integration mechanism 30. A left S-axis represents a rotation speed of the sun gear 31 that is equivalent to the rotation speed Nm1 of the motor MG1. A middle C-axis represents a rotation speed of the carrier 34 that is equivalent to the rotation speed Ne of the engine 22. A right R-axis represents the rotation speed Nr of the ring gear 32 obtained by dividing the rotation speed Nm2 of the motor MG2 by the gear ratio Gr of the reduction gear 35. Two thick arrows on the R-axis respectively show a torque applied to the ring gear shaft 32a by output of the torque Tm1 from the motor MG1, and a torque applied to the ring gear shaft 32a via the reduction gear 35 by output of the torque Tm2 from the motor MG2. Equations (1) and (3) are readily introduced from this alignment chart of FIG. 11. Equation (2) is a relational expression of feedback control to drive and rotate the motor MG1 at the target rotation speed Nm1*. In Equation (2), a coefficient 'k1' in a second term and a coefficient 'k2' in a third term on the right side respectively denote a gain of a proportional and a gain of an integral term.

$$Nm1^*=Ne^*\cdot(1+\rho)/\rho-Nm2/(Gr\cdot\rho) \quad (1)$$

$$Tm1^*=\text{Previous}Tm1^*+k1(Nm1^*-Nm1)+k2\int(Nm1^*-Nm1)dt \quad (2)$$

$$Tm2^*=(Tr^*+Tm1^*/\rho)/Gr \quad (3)$$

After setting the target rotation speed Ne* and the target torque Te* of the engine 22, the target timing VT*, and the torque commands Tm1* and Tm2* of the motors MG1 and MG2, the CPU 72 sends the settings of the target rotation speed Ne* and the target torque Te* of the engine 22 and the target timing VT* to the engine ECU 24 and the settings of the torque commands Tm1* and Tm2* of the motors MG1 and MG2 to the motor ECU 40 (step S200) and terminates the drive control routine. In response to reception of the settings of the target rotation speed Ne*, the target torque Te*, and the target timing VT*, the engine ECU 24 performs required controls including fuel injection control and ignition control of the engine 22 to drive the engine 22 at a specific drive point defined by the target rotation speed Ne* and the target torque Te*, while controlling the variable valve timing mechanism 150 to make the open-close timing of the intake value 128 approach to the target timing VT*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. In this state, the engine 22 is driven at the rotation speed of not lower than the minimum rotation speed Nemin1 with an open-close operation of the intake valve 128 at the predetermined timing VT2. Such control ensures efficient operation of the engine 22.

The power demand Pe* of less than the reference value Pref1 at step S130 suggests no operation demand of the engine 22. The CPU 72 then sets both the target rotation speed Ne* and the target torque Te* of the engine 22 to 0 to stop the operation of the engine 22 (step S210), sets the torque command Tm1* of the motor MG1 to 0 (step S220), and divides the torque demand Tr* by the gear ratio Gr of the reduction gear 35 to set the torque command Tm2* of the motor MG2 (step S230). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S240) and terminates the drive control routine. In response to reception of the target rotation speed Ne* and the target torque Te* set equal to 0, the engine ECU 24 keeps the stopped engine 22 in its operation stop state, while stopping the operation of the driven engine 22.

Figure 12:
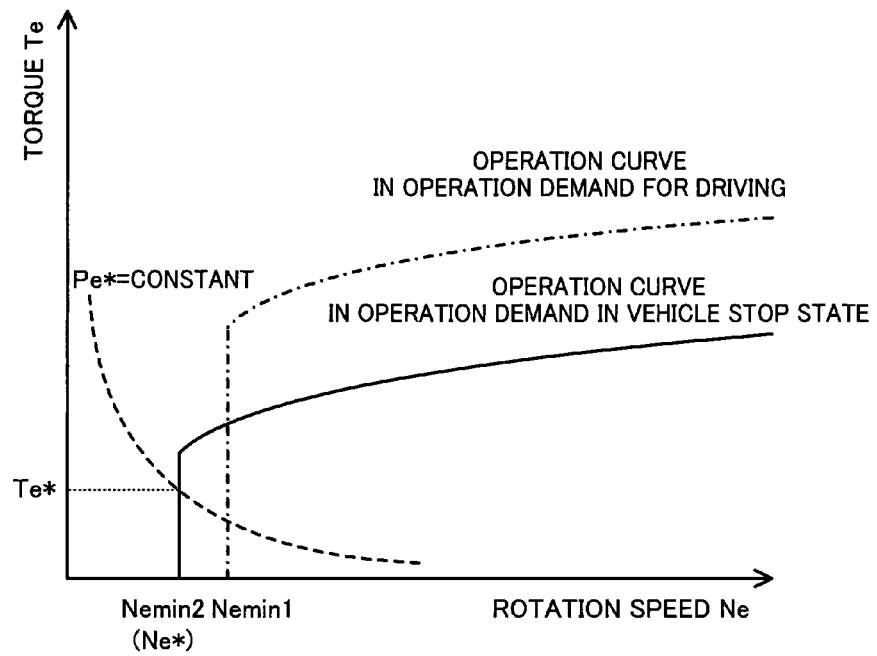
FIG. 12 shows a process of setting the target rotation speed Ne* and the target torque Te* with referring to an operation curve of the engine 22 in vehicle stop-state operation demand.
Figure 13:
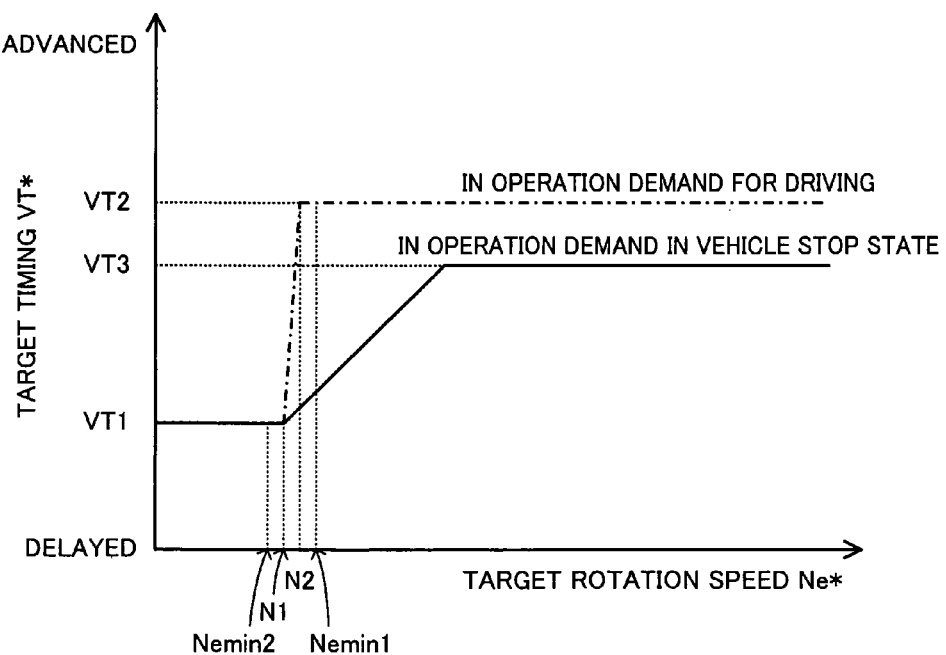
FIG. 13 shows one example of a target timing setting map in vehicle stop-state operation demand.

Upon identification of neither the vehicle in motion nor the vehicle at stop with a drive request at step S110, it is determined that the vehicle is at stop with no drive request. The CPU 72 then sets the power demand Pe* to the charge-discharge power demand Pb* to be charged into or discharged from the battery 50 (step S250) and compares the set power demand Pe* with a preset reference value Pref2 (step S260). The reference value Pref2 is set to identify a charge demand of the battery 50 and is determined according to the properties and the characteristics of the engine 22 to be smaller than the reference value Pref1. The comparison between the power demand Pe* and the reference value Pref2 at step S260 determines whether there is an operation demand of the engine 22 based on a charge demand for the battery 50. The comparison of step S260 may use the state of charge (SOC) of the battery 50 or another suitable factor, instead of the power demand Pe*. The power demand Pe* of not less than the reference value Pref2 suggests an operation demand of the engine 22 based on a charge demand for the battery 50. In the operation stop condition of the engine 22, the motor MG1 is controlled to motor and start the engine 22 (steps S270 and S280). The CPU 72 subsequently sets the target rotation speed Ne* and the target torque Te* of the engine 22 according to the power demand Pe* (step S290) and sets the target timing VT* of the intake valve 128 based on the set target rotation speed Ne* (step S300). The target rotation speed Ne* and the target torque Te* of the engine 22 are set according to an operation curve of the engine 22 in operation demand of the engine 22 in the vehicle stop state without a drive request (hereafter referred to as 'in vehicle stop-state operation demand') and a constant power demand Pe* curve. FIG. 12 shows a process of setting the target rotation speed Ne* and the target torque Te* with referring to an operation curve of the engine 22 in vehicle stop-state operation demand. For the purpose of reference, the operation curve in operation demand for driving is shown as a one-dot chain line curve in FIG. 12. As illustrated, the operation curve of the engine 22 in vehicle stop-state operation demand is set in a range of the rotation speed Ne of not lower than a minimum rotation speed Nemin2, which is lower than the minimum rotation speed Nemin1. The target rotation speed Ne* and the target torque Te* are specified as an intersection of this operation curve and a constant power demand Pe* curve (=Ne*×Te*). The minimum rotation speed Nemin2 is determined according to the properties and the characteristics of the engine 22 and may be set equal to, for example, 700 rpm or 750 rpm. In this state, there is an operation demand of the engine 22 based on a charge demand of the battery 50. The power demand Pe* is generally not a significantly large value with the setting of the charge-discharge power demand Pb*. The target rotation speed Ne* of the engine 22 is thus expected to be equal to or slightly higher than the minimum rotation speed Nemin2. A concrete procedure of setting the target timing VT* in this embodiment provides and stores in advance a variation in target timing VT* against the target rotation speed Ne* of the engine 22 as a target timing setting map in vehicle stop-state operation demand and reads the target timing VT* corresponding to the given target rotation speed Ne* from the map. One example of the target timing setting map in vehicle stop-state operation demand is shown in FIG. 13. For the purpose of reference, the variation in target timing VT* in operation demand for driving is shown by the one-dot chain line. In the illustrated example of FIG. 13, the target timing VT* in vehicle stop-state operation demand is set to the predetermined timing (reference timing) VT1 in a range of the target rotation speed Ne* of the engine 22 of lower than the preset rotation speed N1, which is higher than the minimum rotation speed Nemin2. In a range of the target rotation speed Ne* of not lower than the preset rotation speed N1, the target timing VT* in vehicle stop-state operation demand is smoothly and moderately varied to be advanced from the predetermined timing VT1 to a predetermined timing VT3, which is between the predetermined timing VT1 and the predetermined timing VT2, with an increase in target rotation speed Ne*, compared with the target timing VT* in operation demand for driving. As mentioned above, in vehicle stop-state operation demand, the target rotation speed Ne* of the engine 22 is set equal to or slightly higher than the minimum rotation speed Nemin2. The target timing VT* in vehicle stop-state operation demand is set to have a smaller degree of advance from the predetermined timing (reference timing) VT1 and to be a more delayed timing, compared with the target timing VT* in operation demand for driving. Since the target rotation speed Ne* of the engine 22 is set equal to or slightly higher than the minimum rotation speed Nemin2, the predetermined timing VT3 may represent an identical open-close timing with or a slightly delayed open-close timing than the predetermined timing VT2.

The CPU 72 calculates the torque command Tm1* of the motor MG1 in the same manner as step S180 explained above (step S310) and sets the torque command Tm2* of the motor MG2 to 0 (step S320). The CPU 72 then sends the settings of the target rotation speed Ne* and the target torque Te* of the engine 22 and the target timing VT* to the engine ECU 24 and the settings of the torque commands Tm1* and Tm2* of the motors MG1 and MG2 to the motor ECU 40 (step S330) and terminates the drive control routine. In this state, the motor MG1 uses the output power of the engine 22 to generate electric power, which is charged into the battery 50.

Here it is assumed that the operation of the engine 22 is started in response to a charge demand of the battery 50 in the vehicle stop state. In the structure of the embodiment, the engine 22 is driven at a rotation speed of not lower than the relatively low minimum rotation speed Nemin2. Such drive control effectively reduces the driver's uncomfortable feeling or odd feeling triggered by operation of the engine 22 at a high rotation speed, compared with the control of driving the engine 22 at a rotation speed of not lower than the relatively high minimum rotation speed Nemin1. At the open-close timing of the intake valve 128 set to the predetermined timing (reference timing) VT1, when the engine 22 is started to be driven at the rotation speed of not lower than the minimum rotation speed Nemin2, there may be an insufficient supply of oil required for changing the open-close timing of the intake valve 128 in some condition of the rotation speed Ne of the engine 22. The insufficient oil supply may not allow the open-close timing of the intake valve 128 to be changed from the predetermined timing VT1. The drive control of the embodiment opens and closes the intake valve 128 at the target timing VT* corresponding to the target rotation speed Ne* in vehicle stop-state operation demand. Compared with the open-close operation of the intake valve 128 at the target timing VT* fixed to the predetermined timing VT2 whether in operation demand for driving or in vehicle stop-state operation demand, the drive control of the embodiment ensures the better open-close timing of the intake valve 128 according to the operating condition of the engine 22 and the more appropriate control of the variable valve timing mechanism 150. The target timing VT* is set to smoothly and moderately advance the open-close timing of the intake valve 128 with an increase in target rotation speed Ne* of the engine 22. Such drive control effectively prevents an abrupt change of the target timing VT* against a variation in target rotation speed Ne*.

In response to determination of no charge demand for the battery 50 at step S260, it is determined that there is no operation demand of the engine 22. The CPU 72 accordingly sets both the target rotation speed Ne* and the target torque Te* of the engine 22 to 0 to stop the operation of the engine 22 (step S340) and sets the torque command Tm1* of the motor MG1 and the torque command Tm2* of the motor MG2 to 0 (step S350). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S360) and terminates the drive control routine.

As described above, in vehicle stop-state operation demand to give an operation demand of the engine 22 based on a charge demand of the battery 50 in the vehicle stop state without a drive request, the hybrid vehicle 20 of the embodiment drives the engine 22 at the rotation speed of not lower than the relatively low minimum rotation speed Nemin2. Such drive control effectively reduces the driver's uncomfortable feeling or odd feeling triggered by operation of the engine 22 at a high rotation speed. In operation demand for driving to give an operation demand of the engine 22 for driving, the hybrid vehicle 20 of the embodiment opens and closes the intake valve 128 at the predetermined timing VT2. In vehicle stop-state operation demand, the hybrid vehicle 20 of the embodiment opens and closes the intake valve 128 at a more delayed open-close timing having a smaller degree of advance from the predetermined timing (reference timing) VT1 than the open-close timing in operation demand for driving. Compared with the open-close operation of the intake valve 128 at the fixed timing VT2 whether in operation demand for driving or in vehicle stop-state operation demand, the drive control of the embodiment ensures the better open-close timing of the intake valve 128 according to the operating condition of the engine 22 and the more appropriate control of the variable valve timing mechanism 150. In vehicle stop-state operation demand, the open-close timing of the intake valve 128 is smoothly and moderately advanced with an increase in target rotation speed Ne* of the engine 22. Such drive control effectively prevents an abrupt change of the open-close timing of the intake valve 128 against a variation in target rotation speed Ne*.

The above description regards drive control of the hybrid vehicle 20 of the embodiment in the case of the vehicle in motion or at stop with a drive request and in the case of the vehicle at stop without a drive request. In response to an operation demand of the engine 22 in the case of the vehicle at stop with a drive request, a smoothing operation or a rating operation may be performed to gradually vary the target rotation speed Ne* and the target torque Te* of the engine 22 and the target timing VT* in the transition from the operation curve of the engine 22 in vehicle stop-state operation demand shown in FIG. 12 and the target timing VT* in vehicle stop-state operation demand shown in FIG. 13 to the operation curve of the engine 22 in operation demand for driving shown in FIG. 9 and the target timing VT* in operation demand for driving shown in FIG. 10. The smoothing operation or the rating operation desirably prevents an abrupt change of the target rotation speed Ne* and the target torque Te* of the engine 22 and the target timing VT*.

In the case of the vehicle at stop without a drive request, the hybrid vehicle 20 of the embodiment identifies an operation demand of the engine 22 based on a charge demand for the battery 50. The operation demand of the engine 22 may be based on not only the charge demand for the battery 50 but another demand, for example, a warm-up demand. In the case of idling the engine 22 based on a warm-up demand, the operation of the engine 22 at the relatively low minimum rotation speed Nemin2 effectively reduces the driver's uncomfortable feeling or odd feeling triggered by operation of the engine 22 at a relatively high rotation speed.

In vehicle stop-state operation demand, the hybrid vehicle 20 of the embodiment operates the engine 22 at the rotation speed of not lower than the minimum rotation speed Nemin2, which is lower than the preset rotation speed N1 and the preset rotation speed N2. The minimum rotation speed Nemin2 may be set to a rotation speed approximate to the preset rotation speed N1, as long as the minimum rotation speed Nemin2 is lower than the minimum rotation speed Nemin1 in operation demand for driving. Such modified drive control also effectively reduces the driver's uncomfortable feeling or odd feeling triggered by operation of the engine 22 at a relatively high rotation speed, compared with the operation of the engine 22 at the rotation speed of not lower than the minimum rotation speed Nemin1 in operation demand for driving.

As shown in the target timing setting maps of FIGS. 10 and 13, the hybrid vehicle 20 of the embodiment sets the target timing VT* based on the target rotation speed Ne* of the engine 22. The target timing VT* may alternatively be set based on the rotation speed Ne of the engine 22, instead of the target rotation speed Ne*. The rotation speed Ne of the engine 22 may be computed from a signal of a crank position sensor (not shown) attached to the crankshaft 26 and is input from the engine ECU 24 by communication.

The hybrid vehicle 20 of the embodiment stores the two operation curves, that is, the operation curve in operation demand for driving and the operation curve in vehicle stop-state operation demand. The number of the operation curves applied is, however, not restricted to two. Three or any greater number of operation curves may be stored and used, instead of the two operation curves. For example, multiple operation curves according to the torque demand Tr* may be provided and stored as the operation curve in operation demand for driving. The hybrid vehicle 20 of the embodiment sets the target rotation speed Ne* and the target torque Te* according to the power demand Pe* and the operation curve. The target rotation speed Ne* and the target torque Te* may, however, be set according to only the power demand Pe* without using the operation curve.

Figure 14:
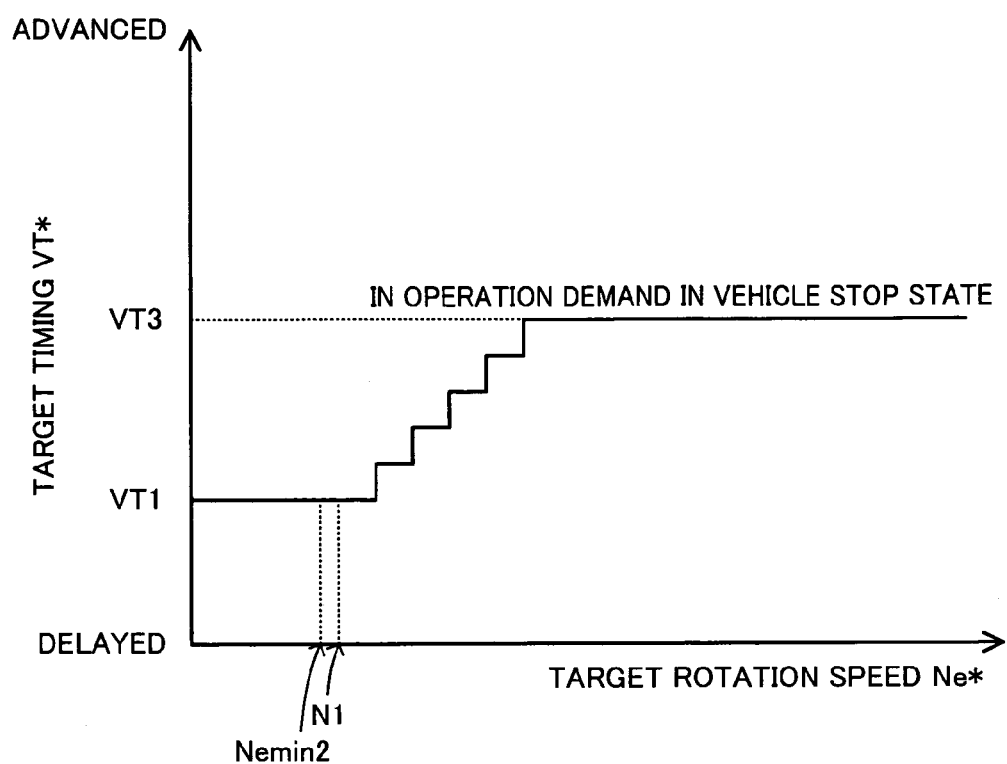
FIG. 14 shows another target timing setting map in vehicle stop-state operation demand as one modified example.

In vehicle stop-state operation demand, the hybrid vehicle 20 of the embodiment sets the target timing VT* to be linearly advanced from the predetermined timing VT1 to the predetermined timing VT3 with an increase in target rotation speed Ne* in the range of the target rotation speed Ne* of not lower than the preset rotation speed N1, as shown in the target timing setting map in vehicle stop-state operation demand of FIG. 13. As shown in one modified target timing setting map in vehicle stop-state operation demand of FIG. 14, the target timing VT* may be set to be advanced stepwise. In operation demand for driving, the target timing VT* may be set to be advanced stepwise in the range of the target rotation speed Ne* of not lower than the preset rotation speed N1 but lower than the preset rotation speed N2. The engine 22 in operation demand for driving is, however, driven at the rotation speed of not lower than the minimum rotation speed Nemin1, which is higher than the preset rotation speed N2, as described previously. The target timing VT* is accordingly fixed to the predetermined timing VT2 as explained above in the embodiment.

The hybrid vehicle 20 of the embodiment has the lock pin 154 designed to fix the open-close timing of the intake valve 128 at the most delayed angle of the intake camshaft 129 and to cancel the fixed open-close timing of the intake valve 128 by means of the oil supply with rotation of the engine 22. The lock pin 154 is, however, not essential but may be omitted. In a modified structure without the lock pin 154, the predetermined timing (reference timing) VT1 may be a specific open-close timing of the intake valve 128 that does not allow application of hydraulic pressure to either of the advance chamber and the delay chamber of the VVT controller 152.

The hybrid vehicle 20 of the embodiment is equipped with the variable valve timing mechanism 150 designed to change only the open-close timing of the intake valve 128. The variable valve timing mechanism 150 may be replaced by a variable valve timing mechanism designed to change only the open-close timing of the exhaust valve 131 or a variable valve timing mechanism designed to change both the open-close timing of the intake valve 128 and the open-close timing of the exhaust valve 131. In application of the variable valve timing mechanism of the modified structure to change only the open-close timing of the exhaust valve 131, a lock pin may be provided to fix the open-close timing of the exhaust valve 131 at a most advanced angle of the exhaust camshaft 131b and cancel the fixed open-close timing of the exhaust valve 131 by means of oil supply with rotation of the engine 22. In this modified application, a reference timing is set to a specific open-close timing of the exhaust valve 131 corresponding to the most advanced angle of the exhaust camshaft 131b. In vehicle stop-state operation demand, the exhaust valve 131 is opened and closed at a more advanced open-close timing to have a smaller degree of delay from the reference timing than the open-close timing in operation demand for driving. The modified drive control ensures the better open-close timing of the exhaust valve 131 according to the operating condition of the engine 22 and the more appropriate control of the variable valve timing mechanism 150 as in the embodiment discussed above.

Figure 15:
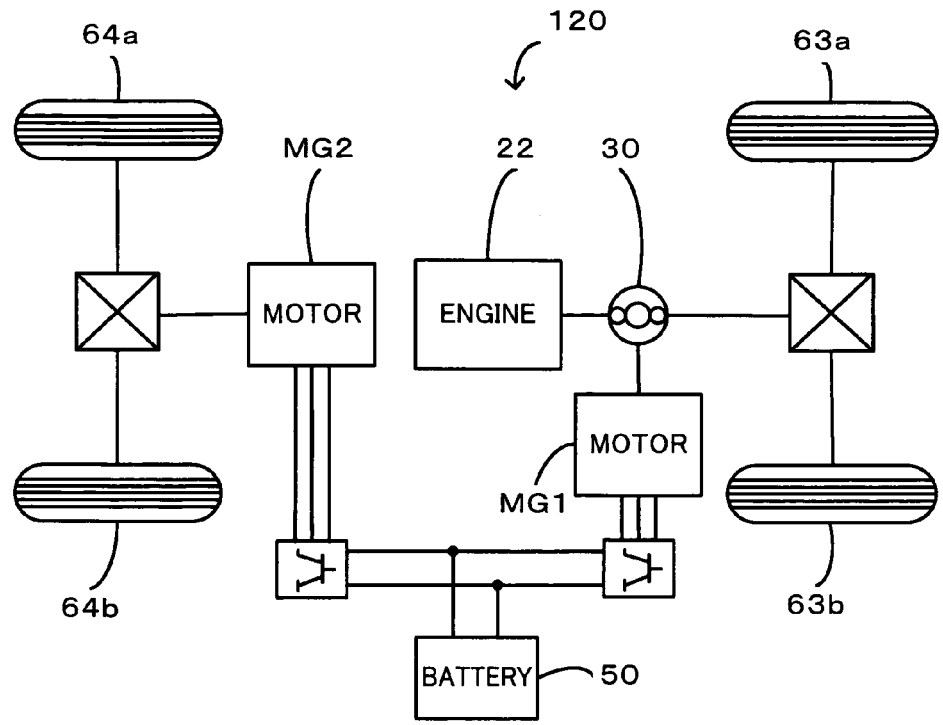
FIG. 15 schematically illustrates the configuration of another hybrid vehicle 120 in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 15, the power of the motor MG2 may be output to another axle (that is, an axle linked with wheels 64a and 64b), which is different from an axle connected with the ring gear shaft 32a (that is, an axle linked with the wheels 63a and 63b).

Figure 16:
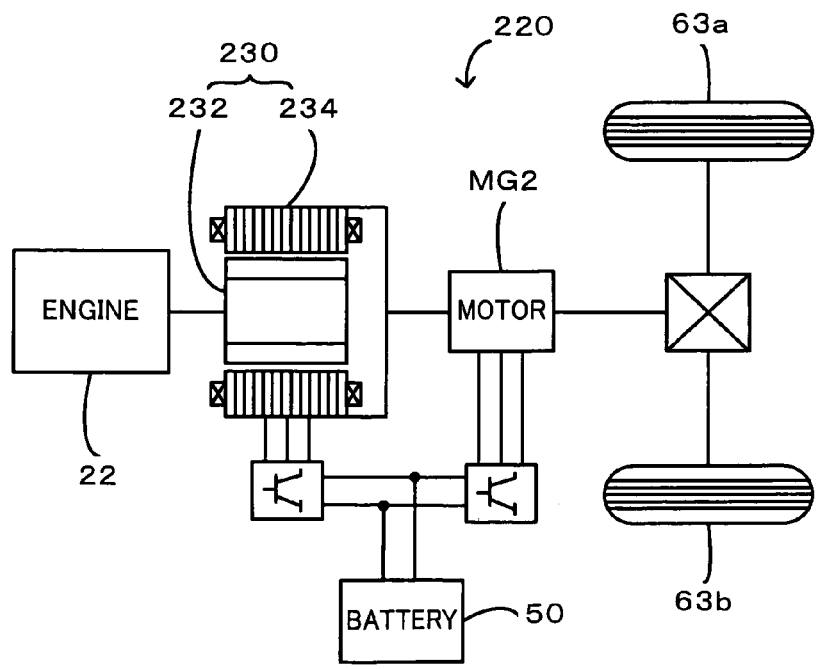
FIG. 16 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 16, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment regards the hybrid vehicle driven with the output power of the engine and the output power of the motor. The technique of the invention is, however, not restricted to the hybrid vehicle of this configuration but is applicable to any motor vehicle equipped with an internal combustion engine configured to output a power for driving the vehicle and to be drivable at any arbitrary drive point irrespective of a driving condition and with an open-close timing change mechanism configured to change the open-close timing of at least one of an intake valve and an exhaust valve of the internal combustion engine by utilizing a supply of an operating fluid with rotation of an output shaft of the internal combustion engine. The technique of the invention is not restricted to such hybrid vehicles or motor vehicles but is also actualized by any of other various vehicles and a control method of such a vehicle.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the present invention is preferably applied to the manufacturing industries of vehicles.

The invention claimed is:

1. A vehicle, comprising:
an internal combustion engine configured to output a power for driving the vehicle and to be drivable at any arbitrary drive point irrespective of a driving condition;
an open-close timing change mechanism configured to change an open-close timing of either an intake valve or an exhaust valve of the internal combustion engine by utilizing a supply of an operating fluid with rotation of an output shaft of the internal combustion engine; and
a controller configured, in an operation demand for driving to give an operation demand of the internal combustion engine for driving the vehicle, to control the open-close timing change mechanism and the internal combustion engine to drive the internal combustion engine at a rotation speed of not lower than a preset first rotation speed with an open-close operation of the intake valve or the exhaust valve of the internal combustion engine at an open-close timing corresponding to a first restriction, and in a vehicle stop-state operation demand to give an operation demand of the internal combustion engine in a vehicle stop state, to control the open-close timing change mechanism and the internal combustion engine to drive the internal combustion engine at a rotation speed of not lower than a preset second rotation speed, which is lower than the preset first rotation speed, with an open-close operation of the intake valve or the exhaust valve of the internal combustion engine at an open-close timing corresponding to a second restriction, which has a smaller degree of change from a reference timing than the first restriction.

2. The vehicle in accordance with claim 1, wherein in the operation demand for driving, the controller performs the control with the first rotation speed set to a specific rotation speed of allowing a supply of the operating fluid required for changing the open-close timing of the intake valve or the exhaust valve of the internal combustion engine to the open-close timing change mechanism, and in the vehicle stop-state operation demand, the controller performs the control with the second rotation speed set to a specific rotation speed of not allowing the supply of the operating fluid required for changing the open-close timing of the intake valve or the exhaust valve of the internal combustion engine to the open-close timing change mechanism.

3. The vehicle in accordance with claim 1, wherein in the operation demand for driving, the controller performs the control with a restriction for ensuring efficient operation of the internal combustion engine set to the first restriction.

4. The vehicle in accordance with claim 1, wherein the open-close timing change mechanism changes the open-close timing of the intake valve and has a fixation-cancellation setter configured to fix the open-close timing of the intake valve at a predetermined first timing, which is a most delayed timing in an available range of the open-close timing of the intake valve, and to cancel the fixation of the open-close timing of the intake valve by utilizing the operating fluid, and the controller performs the control with the predetermined first timing set to the reference timing.

5. The vehicle in accordance with claim 1, wherein the open-close timing change mechanism changes the open-close timing of the exhaust valve and has a fixation-cancellation setter configured to fix the open-close timing of the exhaust valve at a predetermined second timing, which is a most advanced timing in an available range of the open-close timing of the exhaust valve, and to cancel the fixation of the open-close timing of the exhaust valve by utilizing the operating fluid, and the controller performs the control with the predetermined second timing set to the reference timing.

6. The vehicle in accordance with claim 1, wherein the controller performs the control with the reference timing set to an open-close timing of the intake valve or the exhaust valve of the internal combustion engine without utilizing the operating fluid by the open-close timing change mechanism.

7. The vehicle in accordance with claim 1, the vehicle further having:

an operation curve storage unit configured to store multiple operation curves including a first operation curve, which represents a relation of a drive point of the internal combustion engine with the first rotation speed set to a minimum rotation speed to power of the internal combustion engine, and a second operation curve, which represents a relation of a drive point of the internal combustion engine with the second rotation speed set to a minimum rotation speed to the power of the internal combustion engine, wherein the controller sets the drive point of the internal combustion engine in the operation demand for driving according to the stored first operation curve and a power demand required for the internal combustion engine and controls the internal combustion engine to be driven at the set drive point, while setting the drive point of the internal combustion engine in the vehicle stop-state operation demand according to the stored second operation curve and a power demand required for the internal combustion engine and controlling the internal combustion engine to be driven at the set drive point.

8. The vehicle in accordance with claim 7, wherein the controller performs the control with the second restriction set to a restriction of smoothly increasing a change degree from the reference timing with an increase in target rotation speed at the set drive point of the internal combustion engine.

9. The vehicle in accordance with claim 1, the vehicle further having:

a power generator configured to enable power input and power output from and to the output shaft of the internal combustion engine; and an accumulator configured to transmit electric power to and from the power generator, wherein the controller performs the control in response to a charge demand for the accumulator in the vehicle stop state as the vehicle stop-state operation demand.

10. The vehicle in accordance with claim 9, the vehicle further having:

a motor configured to enable power input and power output from and to an axle of the vehicle, wherein the power generator includes an electric power-mechanical power input output structure connected with the output shaft of the internal combustion engine and with the axle and configured to output at least part of power of the internal combustion engine to the axle through input and output of mechanical power and electric power.

11. A control method of a vehicle, the vehicle having: an internal combustion engine configured to output a power for driving the vehicle and to be drivable at any arbitrary drive point irrespective of a driving condition; and an open-close timing change mechanism configured to change an open-close timing of either an intake valve or an exhaust valve of the internal combustion engine by utilizing a supply of an operating fluid with rotation of an output shaft of the internal combustion engine, in an operation demand for driving to give an operation demand of the internal combustion engine for driving the vehicle, the control method controlling the open-close timing change mechanism and the internal combustion engine to drive the internal combustion engine at a rotation speed of not lower than a preset first rotation speed with an open-close operation of the intake valve or the exhaust valve of the internal combustion engine at an open-close timing corresponding to a first restriction, and in a vehicle stop-state operation demand to give an operation demand of the internal combustion engine in a vehicle stop state, the control method controlling the open-close timing change mechanism and the internal combustion engine to drive the internal combustion engine at a rotation speed of not lower than a preset second rotation speed, which is lower than the preset first rotation speed, with an open-close operation of the intake valve or the exhaust valve of the internal combustion engine at an open-close timing corresponding to a second restriction, which has a smaller degree of change from a reference timing than the first restriction.

12. The control method of the vehicle in accordance with claim 11, in the operation demand for driving, the control method performing the control with the first rotation speed set to a specific rotation speed of allowing a supply of the operating fluid required for changing the open-close timing of the intake valve or the exhaust valve of the internal combustion engine to the open-close timing change mechanism, and in the vehicle stop-state operation demand, the control method performing the control with the second rotation speed set to a specific rotation speed of not allowing the supply of the operating fluid required for changing the open-close timing of the intake valve or the exhaust valve of the internal combustion engine to the open-close timing change mechanism.

13. The control method of the vehicle in accordance with claim 11, wherein the open-close timing change mechanism changes the open-close timing of the intake valve and has a fixation-cancellation setter configured to fix the open-close timing of the intake valve at a predetermined first timing, which is a most delayed timing in an available range of the open-close timing of the intake valve, and to cancel the fixation of the open-close timing of the intake valve by utilizing the operating fluid, and the control method performing the control with the predetermined first timing set to the reference timing.

14. The control method of the vehicle in accordance with claim 11, wherein the open-close timing change mechanism changes the open-close timing of the exhaust valve and has a fixation-cancellation setter configured to fix the open-close timing of the exhaust valve at a predetermined second timing, which is a most advanced timing in an available range of the open-close timing of the exhaust valve, and to cancel the fixation of the open-close timing of the exhaust valve by utilizing the operating fluid, and the control method performing the control with the predetermined second timing set to the reference timing.

15. The control method of the vehicle in accordance with claim 11, the control method performing the control with the reference timing set to an open-close timing of the intake valve or the exhaust valve of the internal combustion engine without utilizing the operating fluid by the open-close timing change mechanism.

16. The control method of the vehicle in accordance with claim 11, the control method storing multiple operation curves including a first operation curve, which represents a relation of a drive point of the internal combustion engine with the first rotation speed set to a minimum rotation speed to power of the internal combustion engine, and a second operation curve, which represents a relation of a drive point of the internal combustion engine with the second rotation speed set to a minimum rotation speed to the power of the internal combustion engine, the control method setting the drive point of the internal combustion engine in the operation demand for driving according to the stored first operation curve and a power demand required for the internal combustion engine and controlling the internal combustion engine to be driven at the set drive point, while setting the drive point of the internal combustion engine in the vehicle stop-state operation demand according to the stored second operation curve and a power demand required for the internal combustion engine and controlling the internal combustion engine to be driven at the set drive point.

17. The control method of the vehicle in accordance with claim 16, the control method performing the control with the second restriction set to a restriction of smoothly increasing a change degree from the reference timing with an increase in target rotation speed at the set drive point of the internal combustion engine.

* * * * *